United States Patent [19]

Neugebauer

[11] Patent Number: 4,653,625
[45] Date of Patent: Mar. 31, 1987

[54] FLUID FRICTION CLUTCH

[75] Inventor: Dieter Neugebauer, Schweinfurt, Fed. Rep. of Germany

[73] Assignee: Fichtel & Sachs AG

[21] Appl. No.: 865,064

[22] Filed: May 19, 1986

[30] Foreign Application Priority Data

May 25, 1985 [DE] Fed. Rep. of Germany ....... 3518931

[51] Int. Cl.⁴ .............................................. F16D 31/00
[52] U.S. Cl. ................................. 192/58 B; 192/82 T
[58] Field of Search ............................ 192/58 B, 82 T

[56] References Cited

U.S. PATENT DOCUMENTS

| | | | |
|---|---|---|---|
| 3,419,122 | 12/1968 | Connelly | 192/58 B |
| 3,463,282 | 8/1969 | Fujita et al. | |
| 3,858,697 | 1/1975 | Brewer et al. | 192/58 B |
| 4,086,989 | 5/1978 | Spence | 192/82 T X |
| 4,116,318 | 9/1978 | Crisenberg et al. | 192/58 B |
| 4,271,946 | 6/1981 | Bridge | 192/58 B |
| 4,403,684 | 9/1983 | Haeck | 192/82 T X |
| 4,437,554 | 3/1984 | Haeck | 192/58 B |
| 4,441,599 | 4/1984 | Storz | 192/58 B |
| 4,446,952 | 5/1984 | Masai | 192/58 B |
| 4,485,902 | 12/1984 | Storz | 192/82 T X |
| 4,564,093 | 1/1986 | Storz | 192/82 T X |
| 4,564,094 | 1/1986 | Storz | 192/82 T X |
| 4,592,456 | 6/1986 | Neugebauer | 192/82 T X |

*Primary Examiner*—Carl D. Friedman
*Attorney, Agent, or Firm*—Toren, McGeady and Goldberg

[57] ABSTRACT

The temperature-controlled fluid friction clutch, suitable especially for a cooling fan, comprises a rotor which is arranged in a housing, rotatably in relation to the housing, forming at least one shear gap for the viscous fluid transmitting the torque. A scraper conveys the viscous fluid according to the dynamic pressure principle out of a working chamber containing the rotor into a reservoir chamber. The scraper is connected with the housing and lied radially opposite to the external circumference of the rotor, forming a scraper gap. The housing consists of a material the coefficient of thermal expansion of which is greater than that of the material of the rotor. In this way the scraper gap is enlarged with rising temperature, whereby the pump power of the scraper is reduced with rising temperature. The clutch unites good cold-start behavior with low temperature-actuation hysteresis in the operationally hot condition.

3 Claims, 2 Drawing Figures

FLUID FRICTION CLUTCH

BACKGROUND OF THE INVENTION

The invention relates to a fluid friction clutch, especially for a cooling fan.

Fluid friction clutches of this kind are known, for example from U.S. Pat. No. 3,463,282. They comprise in general a rotor rotatable about an axis of rotation and a housing rotatable coaxially in relation to the rotor and containing a reservoir chamber for a viscous fluid or shear fluid and a working chamber. The rotor is arranged in the working chamber and forms, together with wall faces of the housing, at least one shear gap which, when it is filled with viscous fluid, transmits the torque from the rotor to the housing. A temperature-control device controls the circulation of the viscous fluid between the reservoir chamber and the working chamber and comprises a temperature-dependent valve and a pump device which is effective when the rotor and the housing are in relative rotation. The valve temperature-dependently controls the inflow of the viscous fluid from the reservoir chamber into the working chamber, while the pump device conveys the viscous fluid back from the working chamber into the reservoir chamber.

The pump device of conventional fluid friction clutches comprises an annular pump gap into which there extends a scraper held on the housing. The scraper presses the viscous fluid into the pump gap, and the dynamic pressure forces the viscous fluid back through an opening or passage into the reservoir chamber. In the case of the clutch according to U.S. Pat. No. 3,463,282 the pump gap is defined by mutually radially opposite annular faces on the rotor and on the housing.

The fluid friction clutch must fulfil a number of requirements. By reason of its design the shear gap fills with viscous fluid when the clutch is not rotating. If the internal combustion engine is started in the cold condition the clutch is initially engaged, which per se is undesired. The time interval until the subsequent disconnection of the clutch should be as short as possible, which can be achieved by a high pump power of the pump device. In pump devices with high pump power the scraper gap between the scraper and the opposite annular surface of the pump gap is very narrow, in order to avoid dynamic pressure losses.

On the other hand a comparatively high pump power of the pump device effects a great actuation hysteresis, that is a great temperature difference between the engagement temperature and the disengagement temperature of the clutch. Great values of the actuation hysteresis result especially from the fact that the valve controlling the inflow of the viscous fluid to the working chamber must open relatively wide in order to balance the high pump power of the pump device. Great values of the actuation hysteresis are undesired, since they impair the temperature regulation properties of the clutch.

The invention is directed towards provision of a fluid friction clutch, especially for a cooling fan of an internal combustion engine, which has good cold-start properties and also a low actuation hysteresis at the same time.

SUMMARY OF THE INVENTION

The fluid friction clutch according to the invention has a pump device with an annular pump gap which is radially defined by mutually radially opposite annular surfaces on the rotor and the housing and has at least one pumping element or scraper protruding radially from the annular surface of the housing towards the annular surface of the rotor and forming, with the annular surface of the rotor, a radial scraper gap. The part forming the radially outer annular surface consists of a material which has a greater coefficient of thermal expansion than the material of the part forming the radially inner annular surface. In this way the pump device can be dimensioned for optimum cold-start properties. By reason of the coefficients of thermal expansion selected in accordance with the invention the scraper gap is enlarged with rising temperature, whereby the pump power of the pump device is reduced with rising temperature. However the reduction of the pump power at the same time also reduces the actuation hysteresis, that is the temperature difference between the engagement temperature and the disengagement temperature of the clutch at working temperature. The clutch according to the invention is of especially simple construction.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE DRAWINGS

Figure 1:
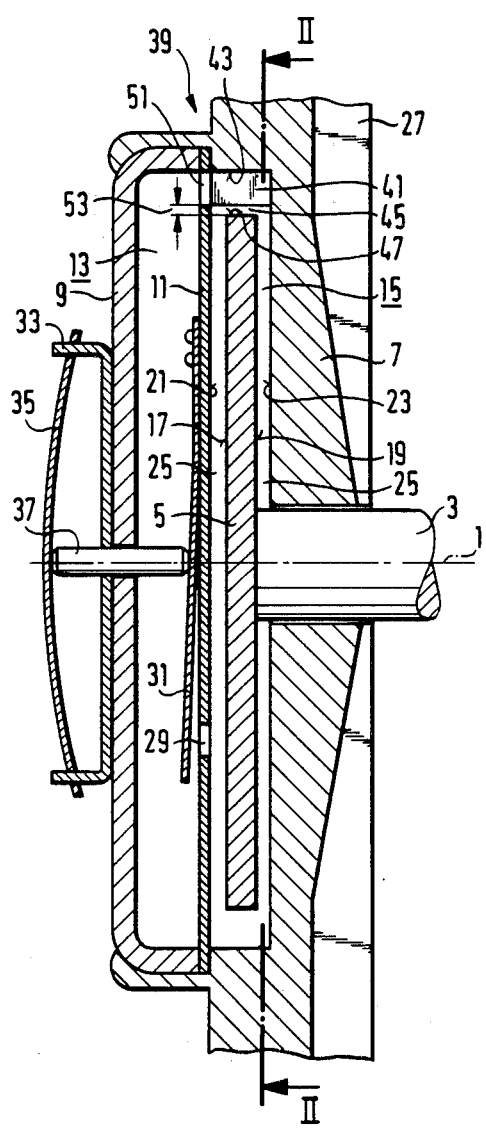
FIG. 1 shows a diagrammatic axial longitudinal section through a fluid friction clutch for a cooling fan of an internal combustion engine.
Figure 2:
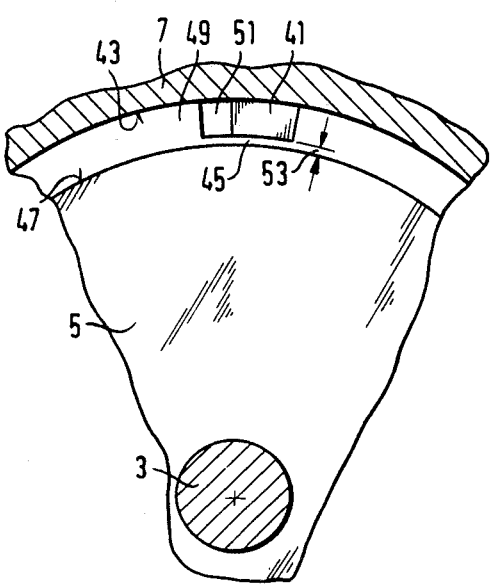
FIG. 2 shows a partial axial cross-section through the clutch according to FIG. 1, seen along a line II—II.

The fluid friction clutch comprises a drive shaft 3 driven about a rotation axis 1 by an internal combustion engine of a motor vehicle, on the end face of which shaft there is secured a rotor disc 5 extending substantially perpendicularly of the rotation axis 1. A substantially pot-shaped housing part 7 is mounted coaxially rotatably in relation to the rotor disc 5 on the drive shaft 3. The housing part 7 grasps over the external circumference of the rotor disc 5 and is closed by a cover 9 on the side of the rotor disc 5 axially remote from the drive shaft 3. A partition 11 divides the housing, formed by the housing part 7 and the cover 9, into a reservoir chamber 13 for viscous fluid and a working chamber 15 lying axially beside the reservoir chamber and enclosing the rotor disc 5. Between the side faces 17, 19 of the rotor disc 5 for the one part and the opposite wall surface 21 of the partition 11 and the wall face 23 of the housing part 7 respectively for the other part there are formed shear gaps 25 which, when they are filled with viscous fluid, transmit the torque from the rotor disc 5 to the housing part 7 and thus to several fan blades 37, represented only partially in FIG. 1.

The clutch is engageable and disengageable in dependence upon temperature. For this purpose a valve opening 29 which is closable by a valve lever 31 secured on the partition 11 is provided in the partition 11. The valve lever 31 is formed as a leaf spring and is initially stressed into its position clearing the opening 29. A bimetallic element 35 which acts upon the valve lever 31 through a central pin 37 axially displaceably guided in the cover 9 is secured on a holder 33 on the outside of the cover 9. The bimetallic element 35 controls the valve lever 31 so that in the cold condition the valve opening 29 is closed and with rising temperature the opening 29 is opened.

In the region of the external circumference of the rotor disc 5 there is provided a pump device, designated generally by 39. The pump device 39 comprises a scraper or pumping element 41 which protrudes radially inwards from a cylinder inner surface 43 of the housing part 7. The scraper element 41 is connected integrally with the housing part 7 and terminates, forming a scraper gap 45, with radial spacing from a cylinder circumferential surface 47 of the rotor disc 5. The mutually radially opposite cylinder surfaces 43, 47 form an annular pump gap which the scraper element 41 closes over the entire axial width except for the scraper gap 45. On the side of the scraper element 41 lying to the rear in the direction of relative rotation of the rotor disc 5 and the housing part 7 an opening 51 is provided in the partition 11, through which the viscous fluid piled up in the relative rotation of the rotor disc 5 and the housing part 7 is conveyed back out of the working chamber 15 into the reservoir chamber 13.

The clutch works as follows:

When the clutch is engaged the shear gaps 25 are filled with viscous fluid, whereby the drive torque of the drive shaft 3 is transmitted by way of the rotor disc 5 and the shear fluid in the shear gaps 25 to the housing part 7 and the partition 11 and thus to the fan blades 27. By reason of the necessarily occurring slip a relative rotation occurs between the rotor disc 5 and the scraper element 41, by which shear fluid is conveyed through the opening 51 from the working chamber 15 into the reservoir chamber 13. In dependence upon the temperature detected by means of the bimetallic element 35 the valve lever 31 and thus the width of opening of the opening 29 are controlled so that a state of equilibrium results between inflowing and outflowing viscous fluid.

In the cold operating condition the valve lever 31 closes the opening 29 and thus interrupts the inflow of the viscous fluid from the reservoir chamber 13 into the working chamber 15. The pump device 39 pumps the viscous fluid substantially completely out of the working chamber, whereby the clutch is disengaged.

The pump power of the pump device 39 depends inter alia upon the radial width 53 of the scraper gap 45. The smaller is the scraper gap 45, the greater is the pump power, since dynamic pressure losses are avoided. The pump power of the pump device 39 should be comparatively great in order to ensure a good cold-start behavior of the clutch. When the clutch is stationary viscous fluid collects, for example through the opening 29, in the working chamber 15, which is undesired in the cold condition since some time elapses before the shear gaps 25 of the thus engaged clutch are pumped empty and the clutch is disengaged. By narrowing of the scraper gap 45 the time required for disconnection of the cold clutch can be reduced. However the increase of pump power for the improvement of the cold-start behavior has the consequence that in the operationally hot condition the valve lever 31 must be lifted comparatively far from the opening 29 in order to render possible a sufficiently great inflow of viscous fluid into the working chamber to compensate for the pumped-out fluid. Thus the bimetallic element 35 must be dimensioned for a comparatively great stroke and thus for a comparatively great temperature hysteresis. However a small temperature hysteresis is desirable in order to keep the temperature which is to be regulated by means of the cooling fan as constant as possible.

In order to reduce the temperature hysteresis of the operationally hot clutch the housing part 7, which carries the scraper body 41, consists of a material the coefficient of thermal expansion of which is greater than that of the material of the rotor disc 5. In this way the scraper gap 45 is enlarged with rising temperature, whereby the pump power of the pump device 39 is reduced. Since the scraper gap 45 is a radial, comparatively narrow gap of a few tenths of a millimeter, sufficient length differences of the rotor disc 5, between the rotation axis 1 and the circumference 47, for the one part, and of the housing part 7, between the rotation axis 1 and the scraper body 41, for the other part occur. Suitable material pairings are for example steel or cast iron for the rotor disc 5 and cast aluminium for the housing part 7.

While specific embodiments of the invention have been shown and described in detail to illustrate the application of the inventive principles, it will be understood that the invention may be embodied otherwise without departing from such principles.

What I claim is:

1. A fluid friction clutch comprising a rotor rotatable about a rotation axis, a housing coaxially rotatable in relation to the rotor and containing a reservoir chamber for viscous fluid and a working chamber, wherein said rotor is arranged in the working chamber and together with the housing forms at least one shear gap for the torque transmission, and a control device for the temperature-dependent controlling of a circulation of the viscous fluid between the reservoir chamber and the working chamber, wherein said control device comprises a temperature-dependent valve and a pump device effective on relative rotation of the rotor and the housing, in the region of the external circumference of the rotor, wherein said pump device comprises mutually radially opposite annular surfaces radially defining an annular pump gap, on the rotor and the housing and at least one scraper element which protrudes radially from the annular surface of the housing towards the annular surface of the rotor and with the annular surface of the rotor defines a radial scraper gap, and wherein the part forming said radially outer annular surface and carrying the scraper element consists of a material which has a greater coefficient of thermal expansion than the material of the part forming said radially inner annular surface.

2. A fluid friction clutch according to claim 1, wherein the rotor is formed as a disc held on an input shaft, the external circumference of said disc forming the radially inner annular surface, wherein the housing has at least one face wall mounted rotatably on the input shaft and the scraper element is connected radially outside the external circumference of the disc with said face wall, and wherein at least said face wall of the housing mounted on the input shaft consists of a material the coefficient of thermal expansion of which is greater than that of the material of the disc.

3. A fluid friction clutch according to claim 1, wherein the scraper element is integrally connected with the face wall.

* * * * *